US008752018B2

(12) United States Patent  (10) Patent No.: US 8,752,018 B2
Jones et al.  (45) Date of Patent: Jun. 10, 2014

(54) EMITTING COHERENT OUTPUT FROM MULTIPLE THREADS FOR PRINTF

(75) Inventors: Stephen Jones, San Francisco, CA (US); Geoffrey Gerfin, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 362 days.

(21) Appl. No.: 13/165,629

(22) Filed: Jun. 21, 2011

(65) Prior Publication Data

US 2012/0331470 A1 Dec. 27, 2012

(51) Int. Cl.
G06F 9/44 (2006.01)
G06F 9/45 (2006.01)

(52) U.S. Cl.
USPC .............. 717/124; 717/149; 717/151

(58) Field of Classification Search
None
See application file for complete search history.

(56) References Cited

U.S. PATENT DOCUMENTS

| | | | |
|---|---|---|---|
| 7,240,334 B1 | 7/2007 | Fluke et al. | |
| 7,603,544 B2* | 10/2009 | Piazza | 712/233 |
| 7,728,841 B1* | 6/2010 | Nordquist et al. | 345/533 |
| 7,779,390 B1* | 8/2010 | Allavarpu et al. | 717/124 |
| 8,136,096 B1* | 3/2012 | Lindahl et al. | 717/129 |
| 8,234,635 B2* | 7/2012 | Isshiki et al. | 717/149 |
| 8,266,609 B2* | 9/2012 | Harris | 717/151 |
| 8,561,041 B1* | 10/2013 | Kuznicki et al. | 717/151 |
| 2004/0015884 A1* | 1/2004 | Shann et al. | 717/131 |
| 2005/0086644 A1* | 4/2005 | Chkodrov et al. | 717/124 |
| 2005/0283781 A1* | 12/2005 | Karp et al. | 718/100 |
| 2006/0174225 A1* | 8/2006 | Bennett et al. | 717/124 |
| 2006/0288332 A1* | 12/2006 | Sagar et al. | 717/124 |
| 2007/0150877 A1* | 6/2007 | Emmett et al. | 717/149 |
| 2007/0288900 A1* | 12/2007 | Lev et al. | 717/124 |
| 2007/0288902 A1* | 12/2007 | Lev et al. | 717/124 |
| 2009/0271775 A1* | 10/2009 | Barsness et al. | 717/151 |
| 2011/0219360 A1* | 9/2011 | Srinivasa et al. | 717/124 |
| 2012/0089812 A1* | 4/2012 | Smith | 712/21 |
| 2012/0221808 A1* | 8/2012 | Coon et al. | 711/154 |
| 2012/0317558 A1* | 12/2012 | Agarwal et al. | 717/149 |
| 2012/0317646 A1* | 12/2012 | Huang et al. | 726/24 |

FOREIGN PATENT DOCUMENTS

GB 2480536 A 11/2011
WO 2006071337 A1 7/2006

OTHER PUBLICATIONS

Perrone et al., "The Design of an Output Data Collection Framework for NS-3", Proceedings of the 2013 Winter Simulation Conference, pp. 1-12; <www.eg.bucknell.edu/~perrone/wp-content/uploads/.../wsc2013-dcf.pdf>.*

(Continued)

*Primary Examiner* — Thuy Dao
*Assistant Examiner* — Ben C Wang
(74) *Attorney, Agent, or Firm* — Patterson & Sheridan, LLP

(57) ABSTRACT

One embodiment of the present invention sets forth a technique for emitting coherent output from multiple threads for the printf( ) function. Additionally, parallel (not divergent) execution of the threads for the printf( ) function is maintained when possible to improve run-time performance. Processing of the printf( ) function is separated into two tasks, gathering of the per thread data and formatting the gathered data according to the formatting codes for display. The threads emit a coherent stream of contiguous segments, where each segment includes the format string for the printf( ) function and the gathered data for a thread. The coherent stream is written by the threads and read by a display processor. The display processor executes a single thread to format the gathered data according to the format string for display.

19 Claims, 10 Drawing Sheets

(56) References Cited

OTHER PUBLICATIONS

Liu et al., "DTHREADS—Efficient Deterministic Multithreading", 2011 ACM, SOSP'11, Oct. 23-26, 2011, Cascais, Portugal; pp. 327-336; <http://dl.acm.org/results.cfm?h=1&cfid=396631203&cftoken=47770437>.*

Suárez et al., "Performance Debugging of Parallel and Distributed Embedded Systems", 2000 IEEE, pp. 1-15; <http://ieeexplore.ieee.org/stamp/stamp.jsp?tp=&arnumber=847858>.*

UK Combined Search and Examination Report dated Oct. 11, 2012, Application No. GB1210268.7.

* cited by examiner

US 8,752,018 B2

EMITTING COHERENT OUTPUT FROM MULTIPLE THREADS FOR PRINTF

BACKGROUND OF THE INVENTION

1. Field of the Invention

The present invention generally relates to multi-threaded processing and more specifically to emitting coherent output from multiple threads for printf.

2. Description of the Related Art

During execution of a program by a single-threaded processor, data generated by the program may be output during run-time. The data that is output may be used for debugging of the program, for output of either interim or final computed data, or for other informational purposes.

The standard C language library defines the printf( ) function as a mechanism for emitting formatted data-dependent output from a program at runtime. The printf( ) function accepts a string of text to output, within which may be found optional format specifiers. These are tokens which represent locations within the string where data generated by the program during run-time should be substituted. Format specifiers comprise a % symbol followed by optional formatting codes, and ending with a character indicating the type of data to substitute for each token. Conventional single threaded processing outputs coherent data that is formatted for display when the printf( ) function is executed by the single-threaded processor.

The output of coherent data from multiple threads simultaneously presents a more complex problem, as the multiple threads need access to a single output stream. If multiple threads output without any co-ordination, the resulting display of the text strings and data may be an unintelligible mix of characters generated by the multiple threads as the printf( ) functions are executed.

In addition to the problem encountered with multiple threads accessing a single output stream, the actual formatting of the data for display as specified by the formatting codes presents an additional problem. Specifically, the many conditional branches required to satisfy the complex formatting capabilities of the printf( ) function are ill-suited to a single-instruction multiple-thread (SIMT) execution model, resulting in considerable execution divergence and poor efficiency. Essentially, execution of the multiple threads is serialized for the printf( ) function. Each thread traverses the printf string, substituting data for each token as the token is encountered after reading the data from memory and formatting the data according to the formatting codes.

Accordingly, what is needed in the art is an improved system and method for emitting coherent output from multiple threads for the printf( ) function. Additionally, a technique for maintaining parallel (not divergent) execution of the threads for the printf( ) function is desired to improve run-time performance.

SUMMARY OF THE INVENTION

One embodiment of the present invention sets forth a technique for emitting coherent output from multiple threads for the printf( ) function. Additionally, parallel (not divergent) execution of the threads for the printf( ) function is maintained when possible to improve run-time performance. Processing of the printf( ) function is separated into two tasks, gathering of the per thread data and formatting the gathered data according to the formatting codes for display. The threads emit a coherent stream of contiguous segments, where each segment includes the format string for the printf( ) function and the gathered data for a thread. The coherent stream is written by the threads and read by a display processor. The display processor executes a single thread to format the gathered data according to the format string for display.

Various embodiments of a method of the invention for emitting coherent output from multiple execution threads includes receiving a printf command for execution by multiple execution threads, and, for each execution thread of the multiple execution threads, examining contents of a printf string including a format string and data elements referenced by the printf command. For each execution thread of the multiple execution threads, a thread-specific amount of memory needed to store the contents of the printf string is determined and contiguous portions of memory are allocated in the thread-specific amounts for the multiple execution threads in a buffer that is written to by the multiple execution threads and read by a display processor. Each execution thread of the multiple execution threads then indicates when each one of the contiguous portions of the memory is ready to be read and formatted by the display processor as specified by the format string.

Separating processing of the printf( ) function enables emission of a coherent stream by multiple threads executing in parallel to gather data generated during run-time. The gathered data for each thread may then by formatted and displayed as the coherent stream is written by each thread.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
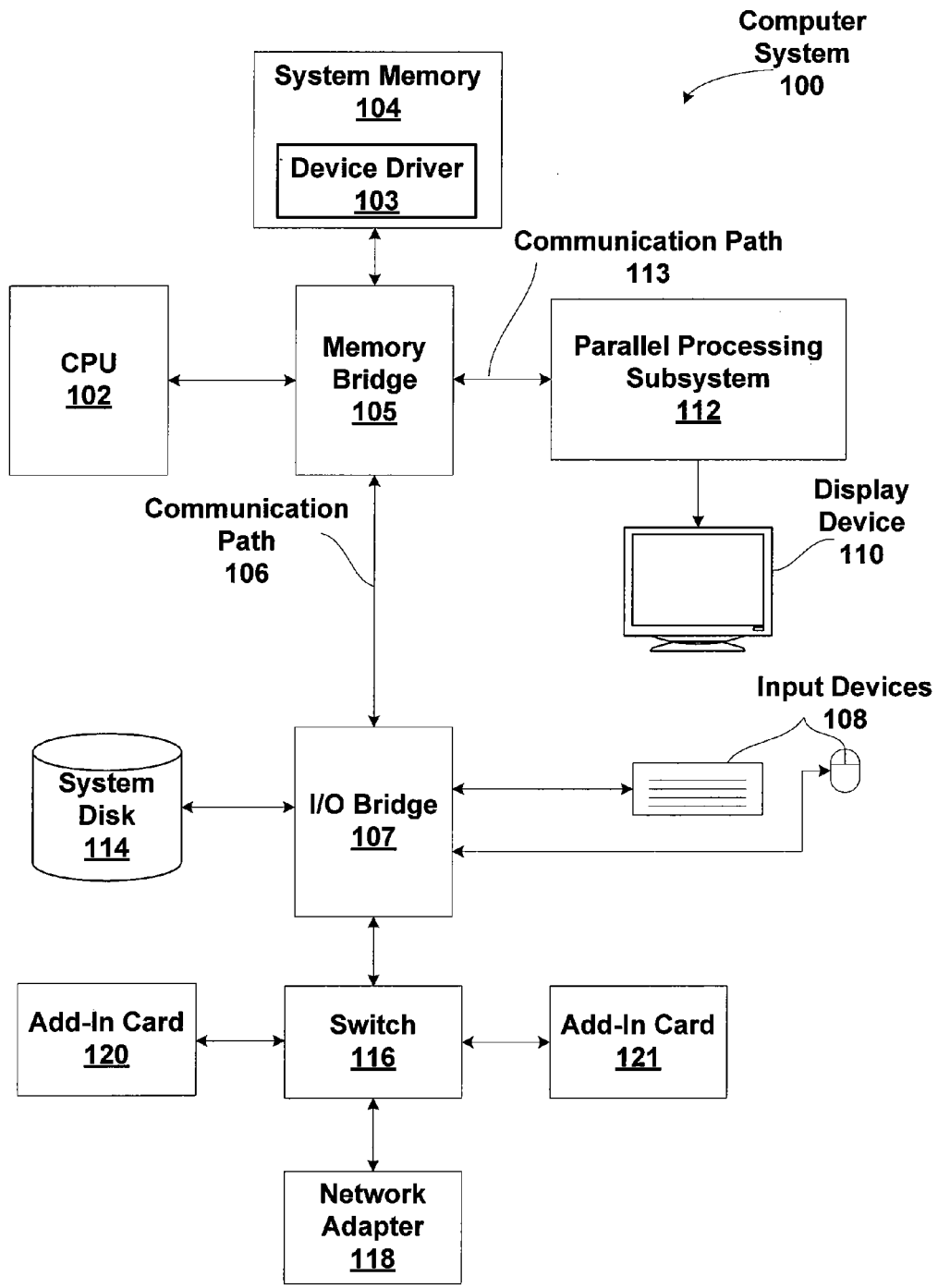
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
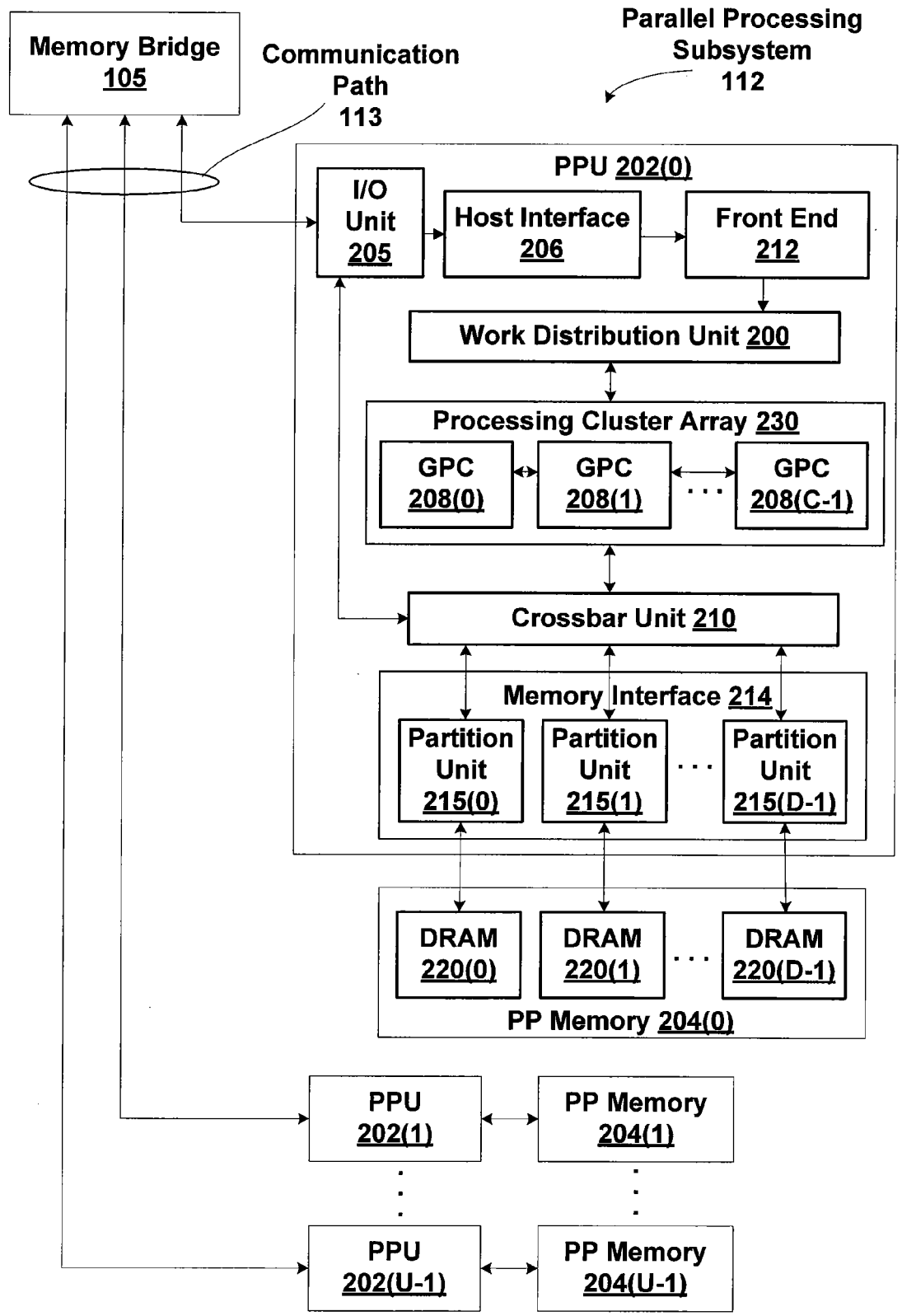
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in pixel space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
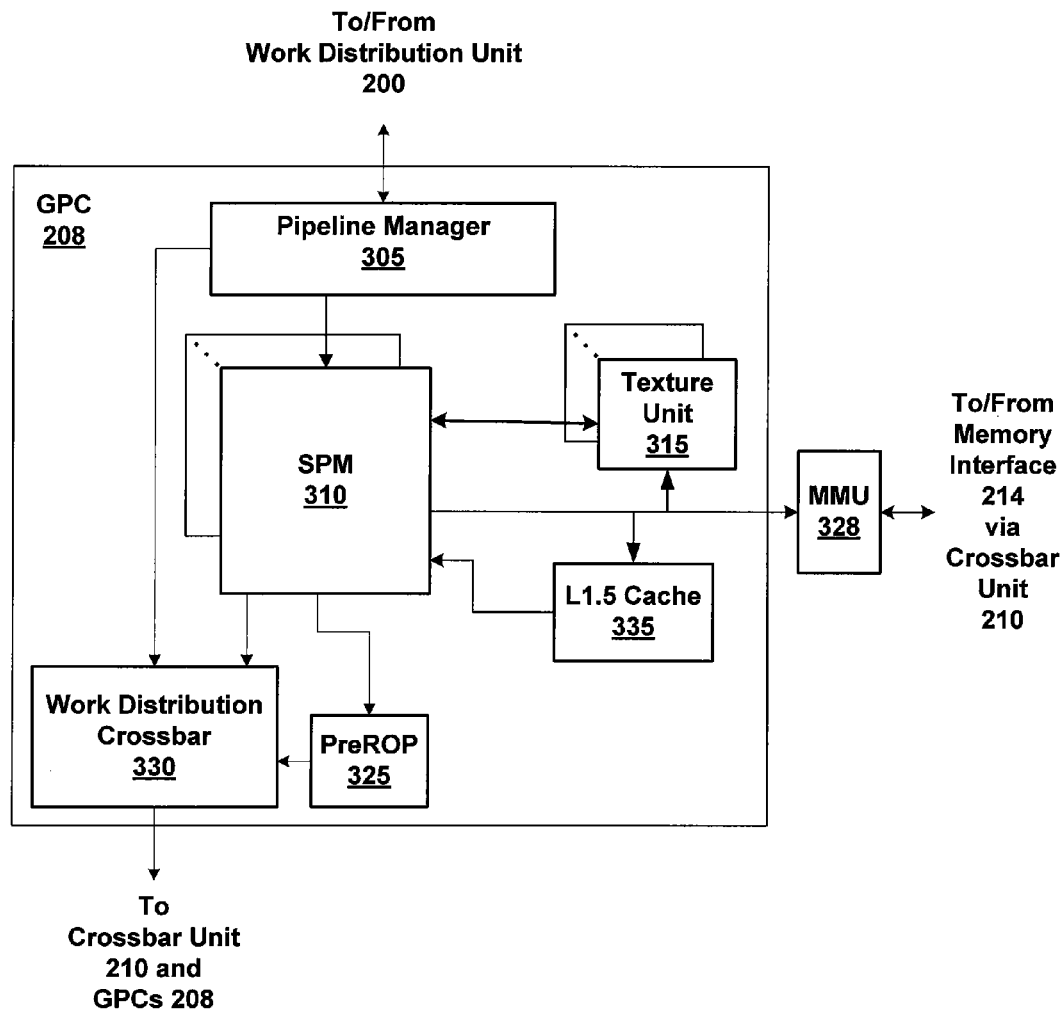
FIG. 3A is a block diagram of a GPC within one of the PPUs of FIG. 2, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
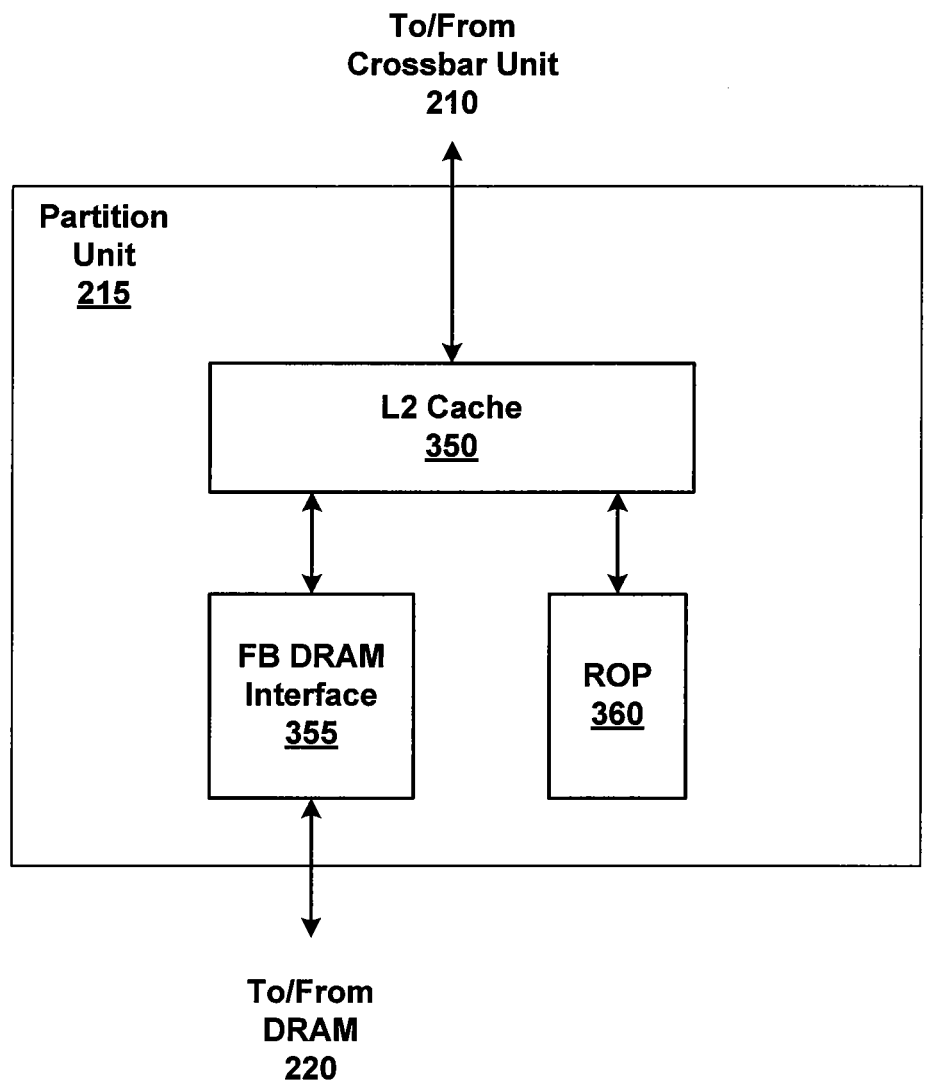
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
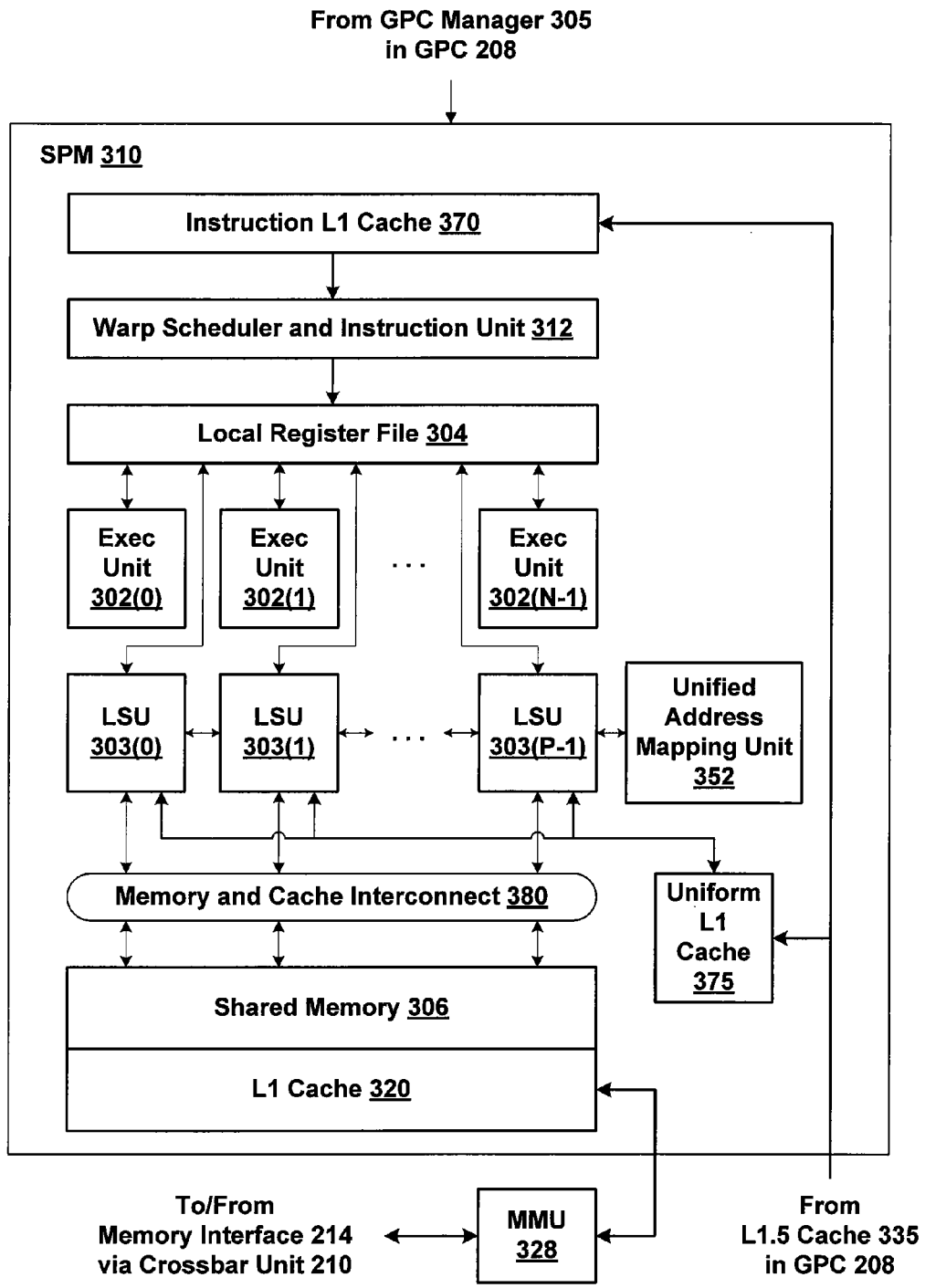
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
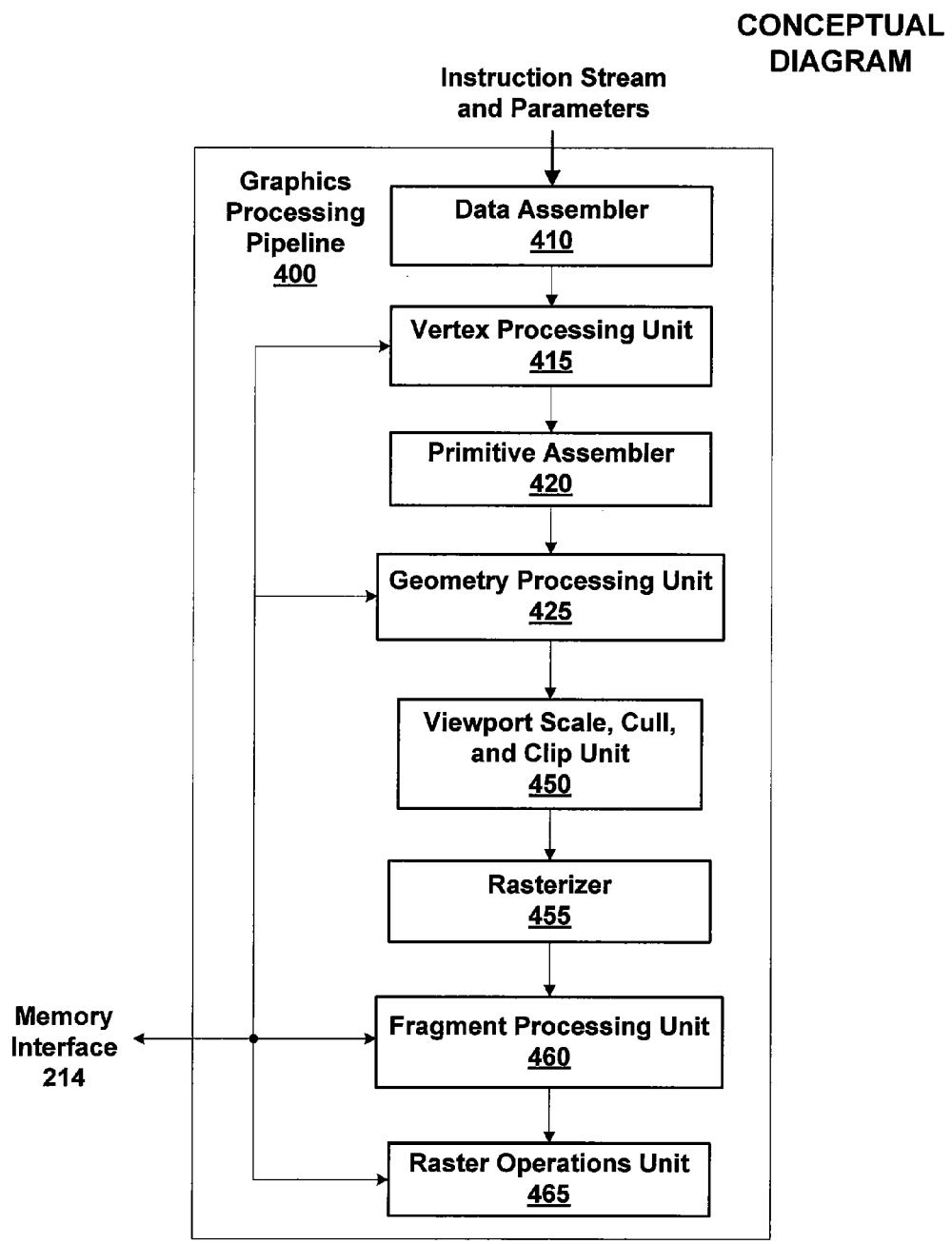
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Printf Command Execution

The printf( ) function includes a format string and data to be substituted into the format string, replacing tokens. The format string may include a format specifier, % that is followed by an optional format code. The format code defines how the data should be formatted. For example, the following printf( ) function:

printf("dog % d has % f spots and is a % s\n" i,j,x);

includes three format specifiers, format codes (d, f, and s), and arguments (i, n, and x) corresponding to data to be substituted. The portion of the printf string that is between "and" is the format string, followed by the arguments. Conventional processing of the printf command by a display processor, such as the CPU 102, constructs the formatted output by examining each character in the format string from left to right. When a format specifier is encountered, the data corresponding to the respective argument is read, formatted according to the format code, and inserted in the output in place of the format specifier and format code. When the format code "s" is encountered, the string corresponding to x is read. This conventional processing sequence is executed in a single-threaded manner and would not benefit from multi-threaded processing because the data corresponding to each argument is typically different, resulting in thread divergence during execution of the printf command.

By separating execution of the printf command into two different tasks multiple threads may execute printf commands in parallel and the formatting may be performed convergently. The first task is analysis of the printf string resulting in gathering the per thread data specified by the arguments into a single coherent stream that also includes the format strings associated with the per thread data. The second task is formatting the gathered data according to the formatting codes for display. This may include conversion of a data value into text form or padding of a string to a particular length.

When a multi-threaded processor processes a printf command the warp or thread group executing in a PPU 202 will typically diverge when the first argument is formatted because each thread will most likely reference an argument having a different value. Formatting of the different values results in each thread needing to perform a different action. The SIMT execution model performs poorly when threads diverge because all threads within a warp execute the same commands; a thread may optionally ignore a command, but then must remain idle while other threads within the warp execute the command. If all threads within a warp need to perform different actions, execution in effect becomes serialized and efficiency is lost.

Of the two tasks, the first task is substantially better suited to the SIMT execution model of the PPU 202 because multiple threads will typically receive the same format string and examination of this string (to locate and interpret format specifiers) results in identical execution for the multiple threads. Divergence is therefore reduced, and additional information about data size may be collected for generation of the single coherent stream.

In contrast, the second task does not benefit from the SIMT execution model of the PPU 202 compared with a single-threaded execution model. Exact formatting of data is, inevitably, entirely data-dependent. In the PPU 202, a single instruction is executed by multiple threads with independent data: therefore, conversion of the data to text form will necessarily usually be different for each one of the multiple threads.

Therefore, the first task is performed by the multi-threaded processor, such as PPU 202 and the second task is performed by a conventional display processor such as CPU 102. However, in one embodiment the PPU 202 may be configured to perform the first and second tasks, where the second task is performed by a single thread. Examination of the format string allows each thread to identify the data specified for output, along with the type of data, size, and other information. The relevant data is then packaged raw (i.e., not in the formatted textual form) along with the unmodified format string and stored as thread output in the single coherent stream. Upon reading the thread output a companion (single-threaded) program executed by the display processor unpacks the information and uses the display processor's own printf function to perform the final formatting and display.

Figure 5A:
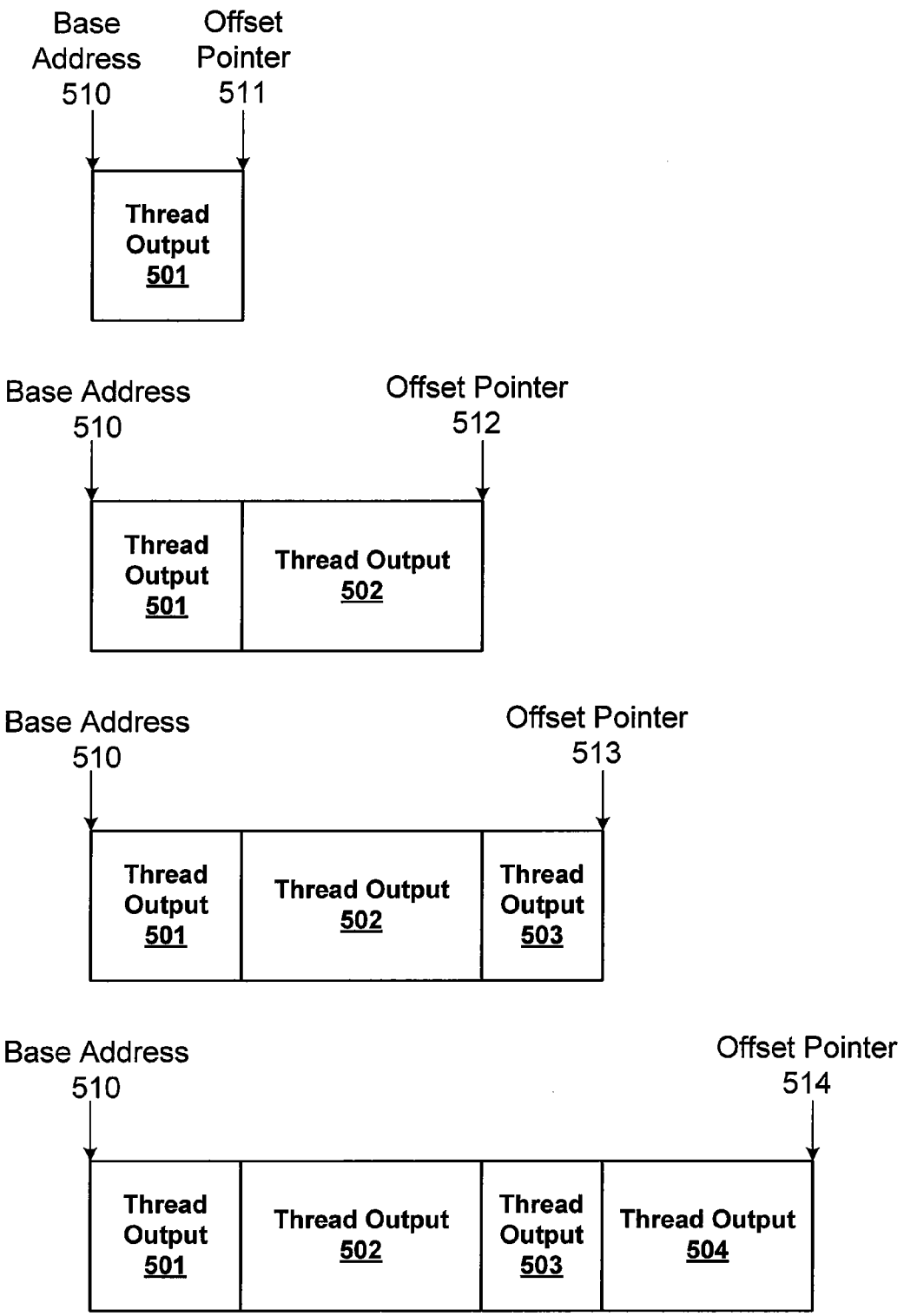
FIG. 5A illustrates output that is emitted from multiple threads and stored in memory, according to one embodiment of the invention.

FIG. 5A illustrates output that is emitted from multiple threads and stored in memory, according to one embodiment of the invention. When processing a printf command a thread does not output fully-formatted data but instead generates thread output 501 for subsequent processing by a single formatting thread for display. To enable efficient communication of the thread output between the multiple threads completing the first task to the single thread completing the second task, the coherent stream of thread outputs 501, 502, 503, and 504 is stored in a buffer that is written by the multiple threads and read by the single thread. Ordered access to this buffer must be enforced to prevent corruption, such as interleaving of data and format streams for different threads of the multiple threads.

As shown in FIG. 5A, a base address 510 and an offset pointer 511 are maintained for the buffer storing the coherent stream. The base address 510 is set to the starting location in memory where the buffer is to be stored. Initially, the offset pointer 511 equals zero and points to the same location as the base address 510. When a portion of the buffer is allocated to store the thread output 501, the offset pointer 511 is updated to equal the size of the thread output 501.

A typical approach to ordering buffer accesses would be to use a lock—a mechanism which ensures that only a single thread can access the buffer at a time. The lock ensures safe non-conflicting access, but at the penalty of serializing access to the buffer. To allow for parallel access of the buffer, a lock-free algorithm is preferred whereby all threads are able to secure storage space for thread output in the buffer unless the buffer itself is full.

The buffer itself is a contiguous section of memory accessible to both the multiple producer threads and the single consumer thread. The buffer may be stored in the PPU memory 204 or the system memory 104. The single consumer thread should avoid reading from locations in the buffer that have not been written by one of the multiple producer threads. The multiple producer threads are each allocated a portion of the buffer in which to store the thread's respective thread output. However, each portion of the buffer allocated to the different threads should be contiguous with the last so that the consumer thread reads from the buffer as a stream.

As shown in FIG. 5A, portions of the buffer are allocated to different threads, once each thread computes the amount of memory needed to store its respective thread output. For example, a first thread is allocated a first portion of the buffer to store thread output 501, a second thread is allocated a second portion of the buffer to store thread output 502, a third thread is allocated a third portion of the buffer to store thread output 503, and a fourth thread is allocated a fourth portion of the buffer to store thread output 504.

To allocate a contiguous portion of the buffer, a pointer to the current "next available" memory location can be incremented atomically by a thread. The atomic operation ensures that even if multiple threads increment the pointer simultaneously, each thread is allocated a different portion that is contiguous with previously allocated portions of the buffer. Note that when the printf string is examined by each thread, the length of the format string and amount of data corresponding to the arguments is determined. The length of the format string and amount of data may be used to allocate the exact number of entries in the buffer that are needed for each thread. Note, that each thread may have a different size thread output because the data for each thread may be different. Additionally, the format string may also be of a different size for each thread.

Assuming that the first portion of the buffer is allocated by the first thread to store thread output 501, one or more additional threads may simultaneously allocate space in the buffer for storage of thread output 502, 503, and 504. For example, when the second thread and the third thread simultaneously allocate storage by atomically incrementing the offset pointer. Because the offset pointer is incremented by the second and third threads, the offset pointer is updated directly from the offset pointer 511 to the offset pointer 513. Alternately, if the second thread allocates storage before the third thread, the offset pointer 511 is updated to the offset pointer 512. When the fourth thread allocates storage by atomically incrementing the offset pointer, the offset pointer 513 is updated to the offset pointer 514.

The buffer is typically stored in physical memory and is therefore limited in size. To avoid allocating past the end of the buffer, it may be configured as a circular buffer. When the last memory location has been allocated the "next available" location moves back to the start of the buffer, e.g., at the base address 510. A challenge with a circular buffer is that atomic access is difficult—the increment of the "next available" pointer may not be able to both add a number and wrap back to the start of the buffer at the base address 510 in a single (atomic) operation. By using an ever-increasing "absolute offset", the offset pointer is not limited by the physical size of the buffer and is divided through use of a modulus operator to produce a logical buffer offset that can wrap back to the base address 510. The modulus of the offset pointer with the buffer length is the actual (logical) position in the buffer for the next allocation. In other words an offset used to identify the next entry for allocation is computed as ((offset pointer) modulus (buffer length)). The physical address of the next entry for allocation is computed as the base address 510 summed with the offset identifying the next entry for allocation.

The thread data 501 at the start of the buffer is the oldest, and if the thread data 501 has been read by the single thread the entries storing thread output 501 may be reallocated to a different thread when the offset pointer wraps to the start of the buffer. The program executed by the multiple threads may be configured to decide whether to fail the printf command or reallocate the entries when the offset pointer wraps to the start of the buffer and the thread output 501 has not been read. A defined buffer protocol between the single consumer thread and the multiple producer threads can be used to enable the multiple producer threads determine entries that may be reallocated. A conventional protocol may be used to ensure that the offset pointer does not pass the read pointer used by the single consumer thread to read the buffer.

Figure 5B:
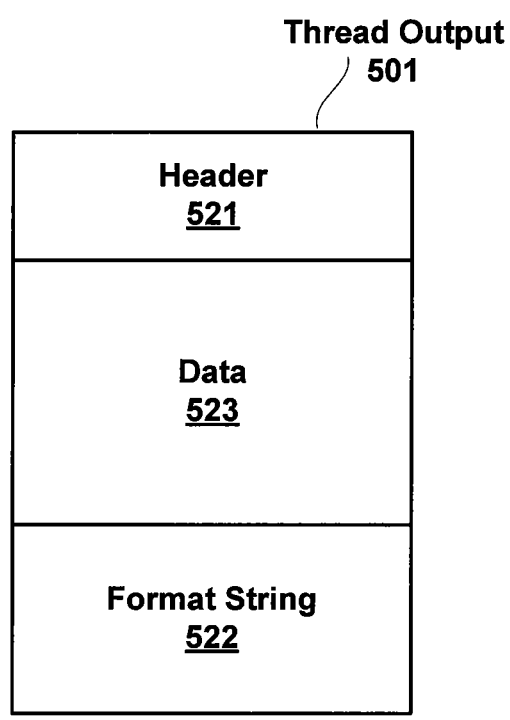
FIG. 5B illustrates details of the output that is emitted for a thread and stored in memory, according to one embodiment of the invention.

FIG. 5B illustrates details of the output that is emitted for a thread and stored in memory, according to one embodiment of the invention. Once a thread has allocated itself a portion of the buffer for storing thread output, the thread may write that thread output to the portion of the buffer. The thread output 501 includes three different sections, a header 521, data 523, and a format string 522. The data 523 is the thread-specific data corresponding to the arguments of the printf command received by the thread. The format string 522 is the format string of the printf command that is received by the thread. The header 521 includes a "ready" bit that is set after the thread writes all of the sections of the thread output 501. The ready bit indicates to the single consumer thread that the thread output 501 may be read. The single consumer thread may be configured to clear the "ready" bit to indicate that the thread output 501 has been read and that the entries storing the thread output 501 may be reallocated to another thread as part of a defined has allocated itself a portion of the buffer for storing thread output, the thread may write that thread output to the portion of the buffer. The thread output 501 includes three different sections, a header 521, data 523, and a format string 522. The data 523 is the thread-specific data corresponding to the arguments of the printf command received by the thread. The format string 522 is the format string of the printf command that is received by the thread. The header 521 includes a "ready" bit that is set after the thread writes all of the sections of the thread output 501. The ready bit indicates to the single consumer thread that the thread output 501 may be read. The single consumer thread may be configured to clear the "ready" bit to indicate that the thread output 501 has been read and that the entries storing the thread output 501 may be reallocated to another thread as part of a defined protocol to ensure that the offset pointer does not pass the read pointer used by the single consumer thread to read the buffer.

The header 521 may also include information determined by the thread during examination of the printf string. Specifically, one or more of the number of arguments specified by the format string (data element count), the length of the format string, and the size of the data (data element length) may be included in the header 521. The single consumer thread may use the information in the header 521 to locate the data included in the data 523 corresponding to the different arguments. The single consumer thread may also use the information in the header 521 to identify the end of the thread output for a thread and the start of the thread output for another thread.

Figure 6A:
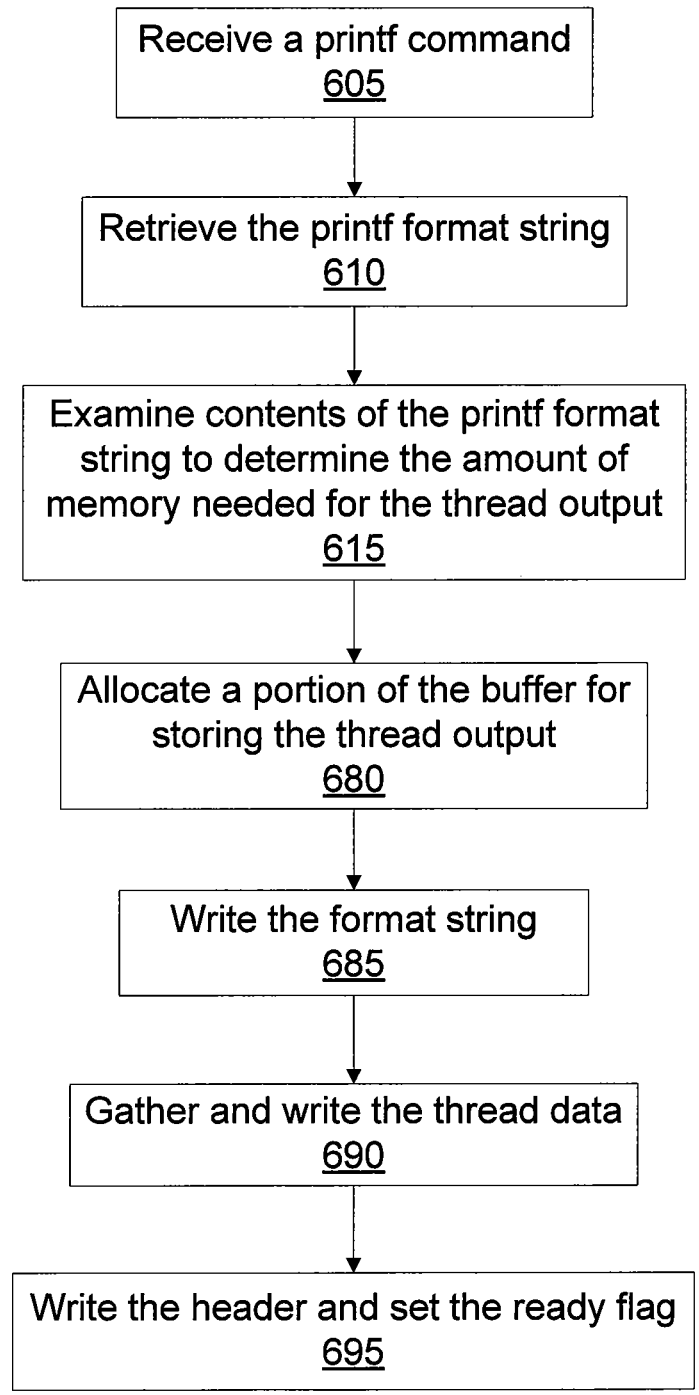
FIG. 6A is a flow diagram of method steps for emitting coherent formatted output from multiple threads for printf, according to one embodiment of the present invention.

FIG. 6A is a flow diagram of method steps for emitting coherent formatted output from multiple threads for printf, according to one embodiment of the present invention. Although the method steps are described in conjunction with the systems of FIGS. 1, 2, 3A, 3B, 3C, and 4, persons skilled in the art will understand that any system configured to perform the method steps, in any order, is within the scope of the invention.

The method steps shown in FIG. 6A are performed by each thread of multiple threads executing a printf command to complete the first task of the two printf processing tasks. At step 605 a thread receives a printf command and at step 610 the thread retrieves the printf format string specified by the printf command. At step 615 the thread examines the contents of the printf format string to determine the amount of memory in the buffer needed for storing the thread output, as described in more detail in conjunction with FIG. 6B. In one embodiment the original printf command specifies arguments and does not include the data in the printf command. The arguments may be replaced with thread-specific data before the printf command is received by each thread at step 605.

At step 680 the thread allocates a portion the buffer to store the thread output by atomically incrementing the offset pointer. At step 685 the thread writes the format string specified by the printf command to the format string 522 of the thread output 501. At step 690 the thread gathers the thread-specific data corresponding to the arguments in the format string and writes the thread-specific data to the data 523 of the thread output 501. At step 695 the thread writes the header 521 of the thread output 501 and sets the ready flag.

Importantly, when a string specifier (% s) is not present in the printf format string, the data does not need to be gathered to determine the amount of data that will stored in the data 523. The printf format string includes information indicating the size of each argument. When a string specifier is present, the string is examined to determine the amount of storage needed for the string data. However, examination of the string data is performed after examining the printf format string. Therefore, a warp will typically not diverge, i.e., the threads will execute in parallel, as each character of the format string is examined. The threads will likely diverge when the string data, if any, is examined. After the amount of storage needed for the data 523 (including any string data) is determined, the storage for the thread output may be allocated.

Figure 6B:
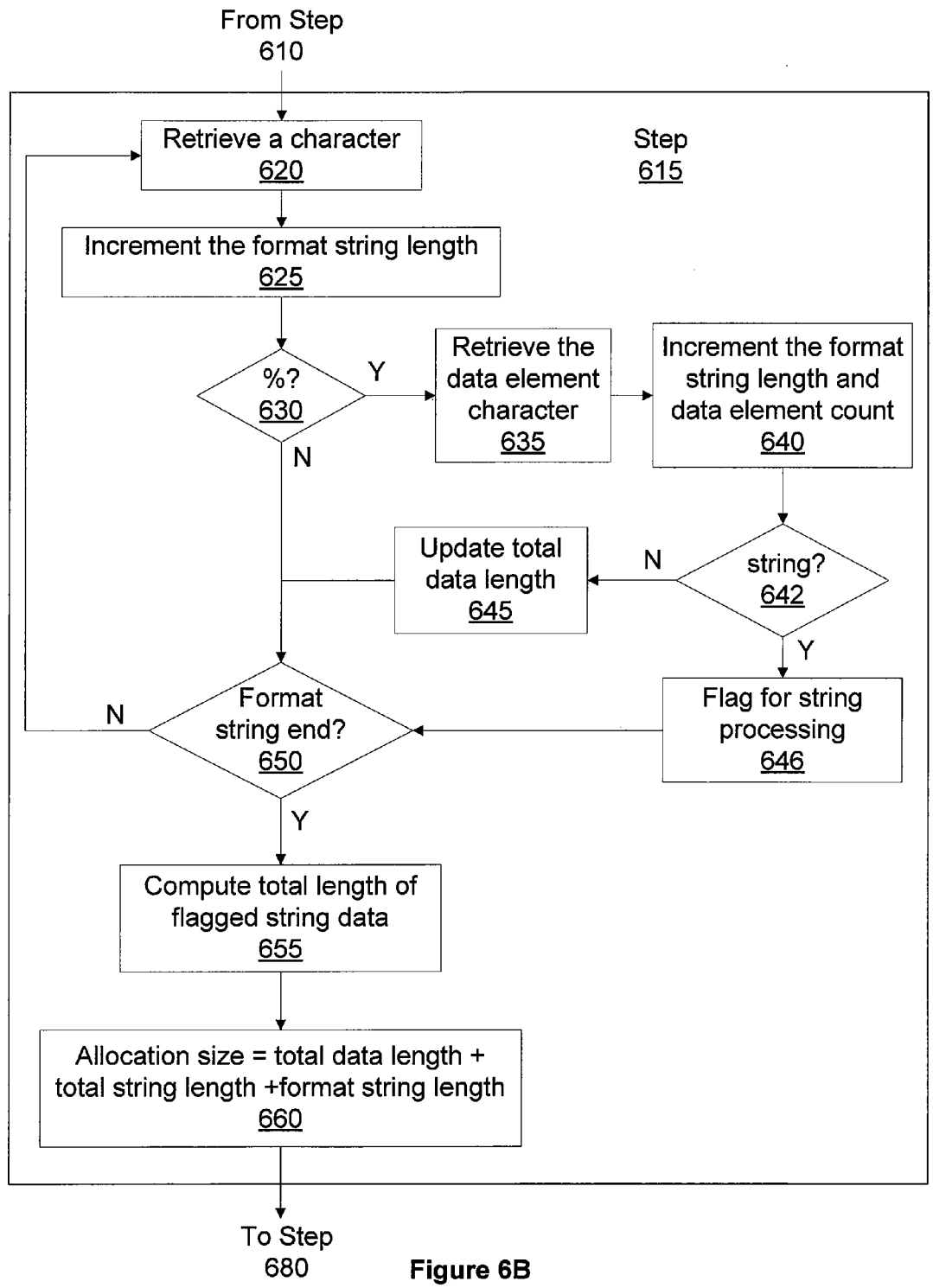
FIG. 6B is a flow diagram of one of the method steps shown in FIG. 6A, according to one embodiment of the present invention.

FIG. 6B is a flow diagram of the method step 615 shown in FIG. 6A, according to one embodiment of the present invention. At step 620 a character is retrieved from the format string by the thread. At step 625 the thread increments the format string length. The format string length indicates the number of characters in the format string. At step 630 the thread examines the character and determines if the character is a format specifier, %, and if not, the thread proceeds directly to step 655. Otherwise, at step 635 the thread retrieves the data element character. The data element character indicates the data type and the format that should be applied to the data for display, e.g., decimal, integer, float, and the like. The data will be substituted in place of the data element character when the second task is completed to format the data. At step 640 the thread increments the format string length to account for the data element character.

At step 642 the thread determines if the data element character indicates that the data type is a string, and, if not the thread proceeds to step 645. Otherwise, at step 646 the printf format string is flagged for string processing 646 before the thread proceeds directly to step 650. The length of the string data is determined at step 655, after the printf format string is parsed.

At step 645 the thread updates the total data length, based on the data element type. At step 650 the thread determines if the end of the format string is reached, and, if not the thread returns to step 620. Otherwise, at step 655 the thread computes the total length of the flagged string data elements by accumulating the length of any string data flagged at step 646 by examining the string data, e.g., reading the string from memory to determine the length of the string data.

At step 655, when the data for one or more threads in a warp differs, execution of the threads will diverge. When the size of the thread-specific data from each thread is determined, the threads converge and parallel execution is resumed. At step 660 the allocation size for the thread is computed by summing the total data length, the total string length, and the format string length. The thread may then increment the offset pointer to allocate a contiguous portion of the buffer in the allocation size.

Separating processing of the printf( ) function into the first and second tasks enables emission of a coherent stream by multiple threads executing in parallel during run-time. The data gathered for each thread may then be read, formatted, and output for display by a display processor executing a single consumer thread as the coherent stream is written by each producer thread. The first task may be executed by multiple threads executing in parallel, minimizing divergence, while the second task is executed by a single thread. The printf commands may be executed during run-time for debugging purposes and to allow visibility into program execution, particularly the generation of intermediate data during execution of the program.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the scope of the invention as set forth in the appended claims. The foregoing description and drawings are, accordingly, to be regarded in an illustrative rather than a restrictive sense.

The invention claimed is:

1. A method of emitting coherent output from multiple execution threads, the method comprising:
receiving a printf command for execution by multiple execution threads;
for each execution thread of the multiple execution threads, examining contents of a printf string including a format string and data elements referenced by the printf command;
for each execution thread of the multiple execution threads, determining a thread-specific amount of memory needed to store the contents of the printf string;
allocating contiguous portions of memory in the thread-specific amounts for the multiple execution threads in a buffer that is written to by the multiple execution threads and read by a display processor; and
indicating, by each execution thread of the multiple execution threads, when each one of the contiguous portions of the memory is ready to be read and formatted by the display processor as specified by the format string.

2. The method of claim 1, wherein the thread-specific amount of memory is computed as a sum of a length of the format string and a size of the data elements.

3. The method of claim 1, further comprising, storing the format string in the continuous portion of memory allocated to a first execution thread of the multiple execution threads.

4. The method of claim 1, further comprising, after the allocating of the contiguous portions of the memory:
computing a length of string data of the data elements for a first execution thread of the multiple execution threads; and
storing the string data in the continuous portion of memory allocated to the first execution thread.

5. The method of claim 4, wherein the first execution thread diverges from other execution threads during the computation of the length of the string data.

6. The method of claim 1, wherein the examining of the contents of the printf string comprises counting the number of characters in the format string in parallel for the multiple execution threads.

7. The method of claim 1, wherein the examining of the contents of the printf string comprises counting the number of data elements to generate a data element count in parallel for the multiple execution threads.

8. The method of claim 1, wherein the allocating comprises incrementing a pointer to an entry in the memory using an atomic operation.

9. The method of claim 8, wherein pointer is an offset from a base address.

10. A system for emitting coherent formatted output from multiple execution threads, the system comprising:

a memory that is configured for access by a multi-threaded processor and a display processor; and the multi-threaded processor that is configured to:

receive a printf command for execution by multiple execution threads;

for each execution thread of the multiple execution threads, examine contents of a printf string including a format string and data elements referenced by the printf command;

for each execution thread of the multiple execution threads, determine a thread-specific amount of the memory needed to store the contents of the printf string;

allocate contiguous portions of the memory in the thread-specific amounts for the multiple execution thread in a buffer that is written by the multiple execution threads and read by the display processor; and indicate, by each execution thread of the multiple execution threads, when each one of the contiguous portions of the memory is ready to be read and formatted as specified by the format string by the display processor.

11. The system of claim 10, wherein the thread-specific amount of memory is computed as a sum of a length of the format string and a size of the data elements.

12. The system of claim 10, wherein the multi-threaded processor is further configured to store the format string in the continuous portion of memory allocated to a first execution thread of the multiple execution threads.

13. The system of claim 10, wherein the multi-threaded processor is further configured to, after the allocating of the contiguous portions of the memory:

compute a length of string data of the data elements for a first execution thread of the multiple execution threads; and store the first data elements in the continuous portion of memory allocated to the first execution thread.

14. The system of claim 13, wherein the first execution thread diverges from other execution threads during the computation of the length of the string data.

15. A non-transitory computer-readable storage medium storing instructions that, when executed by a processor, cause the processor to emit coherent output from multiple execution threads, by performing the steps of:

receiving a printf command for execution by multiple execution threads;

for each execution thread of the multiple execution threads, examining contents of a printf string including a format string and data elements referenced by the printf command;

for each execution thread of the multiple execution threads, determining a thread-specific amount of memory needed to store the contents of the printf string;

allocating contiguous portions of memory in the thread-specific amounts for the multiple execution thread in a buffer that is written by the multiple execution threads and read by a display processor; and indicating, by each execution thread of the multiple execution threads, when each one of the contiguous portions of the memory is ready to be read and formatted by the display processor as specified by the format string.

16. The non-transitory computer-readable storage medium of claim 15, wherein the thread-specific amount of memory is computed as a sum of a length of the format string and a size of the data elements.

17. The non-transitory computer-readable storage medium of claim 15, further comprising, storing the format string in the continuous portion of memory allocated to a first execution thread of the multiple execution threads.

18. The non-transitory computer-readable storage medium of claim 15, wherein the allocating comprises incrementing a pointer to an entry in the memory using an atomic operation.

19. The non-transitory computer-readable storage medium of claim 18, wherein pointer is an offset from a base address.

* * * * *